INCOMING RADAR WAVE

INVENTOR.
EUGENE H. KLINGLER

March 14, 1967 E. H. KLINGLER 3,309,704
TUNABLE ABSORBER

Filed Sept. 7, 1965 4 Sheets-Sheet 2

INVENTOR.
EUGENE H. KLINGLER
By Richard D. Seibel
ATTORNEY

March 14, 1967     E. H. KLINGLER     3,309,704
TUNABLE ABSORBER
Filed Sept. 7, 1965     4 Sheets-Sheet 4
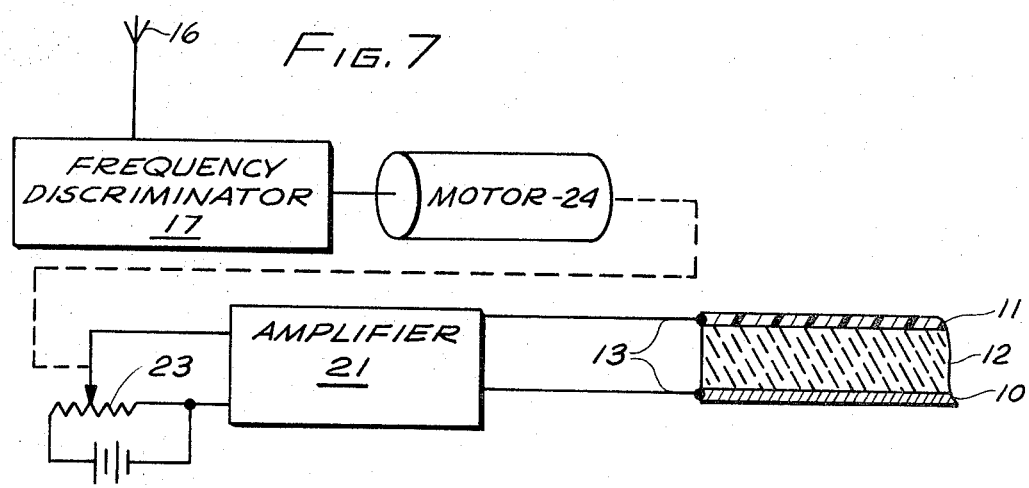
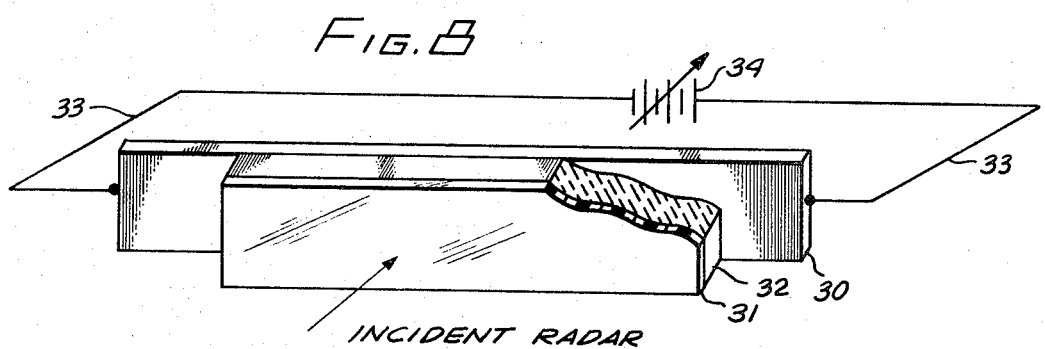
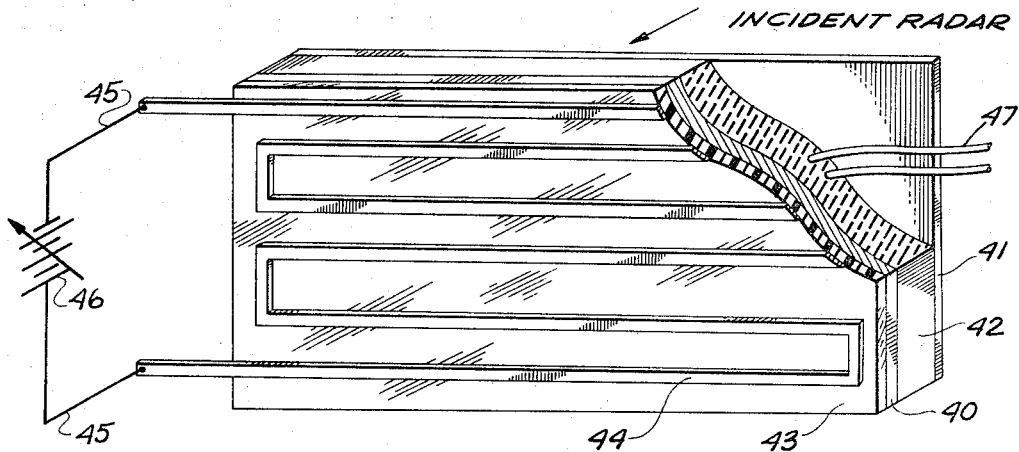
INVENTOR.
EUGENE H. KLINGLER
BY Richard D. Leibel
ATTORNEY United States Patent Office

3,309,704
Patented Mar. 14, 1967

3,309,704
TUNABLE ABSORBER
Eugene H. Klingler, Tulsa, Okla., assignor to
North American Aviation, Inc.
Filed Sept. 7, 1965, Ser. No. 485,239
17 Claims. (Cl. 343—18)

This invention relates to attenuation of electromagnetic energy and in particular to a quarter wave absorber for radar energy.

Modern weapon systems employ radar extensively for the detection and location of targets and counter weapons, therefore it is desirable to provide radar camouflage as well as optical camouflage for weapons and potential targets. Radar camouflage is accomplished by minimizing the reflection of radar from a target, such as, for example, a vehicle or building. Reflection can be reduced by covering the surface of a target with a radar absorbing material or by forming the structure of radar absorbing material. The absorption of radar frequency radiation attenuates the energy in the radar beam and reduces reflection from a target.

Various structures have been devised for the attenuation of radar energy impinging on surfaces having an extent much larger than the wavelength of the radar. Some of these structures have incorporated relatively thick layers of dielectric material having a steady gradation of electric properties so that energy is absorbed in depth. Such attenuators serve to reduce radar reflectance over a relatively broad band of frequency. However, these attenuators are relatively heavy and still have substantial reflectance. Other absorbers have been made employing a conductive layer with a resistive layer spaced one-quarter wave length away from the conductive layer. This is what is known as a quarter wave absorber or Salisbury screen. The quarter wave absorber has electrical properties that tune the absorber to a peak of attenuation at a single frequency and attenuation of other frequencies is low. Since the prior art quarter wave absorber used for radar camouflage is usable at only a single frequency, sandwiches of quarter wave absorbers have been devised to provide attenuation over a broader frequency range. Although useful for many applications, such attenuators are bulky and do not provide optimum attenuation over the entire frequency range.

It is therefore a broad object of this invention to provide a radar attenuator useful over a broad frequency range.

Thus in the practice of this invention according to a preferred embodiment there is provided a radar camouflage system comprising a quarter wave absorber that is tunable over a range of frequencies by varying the effective electrical thickness or varying the electrical parameters of the absorber to obtain optimum attenuation at the frequency of impinging radar. The effective electrical thickness is varied in the absorber by varying the value of an intensive quantity imposed on the absorber such as electric or magnetic field or temperature. As illustrated in a preferred embodiment there is provided an electrically conductive ground plane and an electrically resistive layer giving a front surface impedance of about 377 ohms per square arranged substantially parallel to the conductive ground plane. A dielectric material such as a ferroelectric material or the like is interposed between the ground plane and the impedance layer to reduce the wave length of received radar radiation in the absorber to a fraction of the wave length of radar radiation in free space. Means are provided for detecting the frequency of radar incident on the attenuator and the electrical properties of the dielectric material are adjusted to values giving an effective electrical thickness of the absorber equal to $n/4$ times the wave length of detected radiation traveling through the dielectric material where $n$ is an odd integer. In a preferred embodiment means are provided for imposing an electric field across a ferroelectric material for modifying the electric permittivity thereof. In other embodiments other properties and electrical parameters are modified. Electric currents are employed for imposing a magnetic field on the dielectric material thereby modifying the magnetic permeability thereof or the temperature of the dielectric material is varied thereby modifying the electric permittivity and magnetic permeability. A variation of the present invention is described, illustrated, and claimed in copending U.S. patent application Ser. No. 485,493 by William P. Manning entitled Electromagnetic Energy Attenuator wherein the effective electrical thickness of a quarter wave absorber is adjusted by varying the physical thickness between the conductive ground plane and impedance layer of a quarter wave absorber.

Thus it is a broad object of this invention to provide a radar attenuator operable over a broad frequency.

It is a further object of this invention to provide an improved quarter wave absorber.

Other objects and many of the attendant advantages of this invention will be readily appreciated as the same becomes better understood by reference to the following detailed description when considered in connection with the accompanying drawings wherein:

FIG. 7 illustrates in block form an automatically tuned quarter wave absorber;

FIG. 8 illustrates a portion of a panel of quarter wave absorber tunable by a magnetic field; and FIG. 9 illustrates a portion of a panel of radar attenuator material tunable by varying temperature.

Throughout the drawings like numerals refer to like parts. The absolute mksa units system is employed where appropriate.

Figure 1:
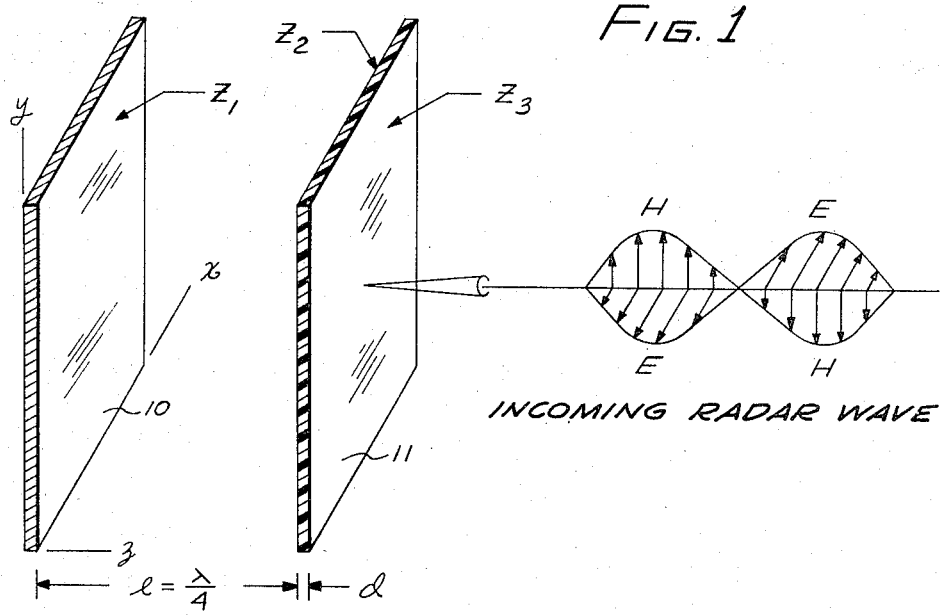
FIG. 1 illustrates schematically a quarter wave absorber.

An ideal static quarter wave absorber comprises a perfectly conductive ground plane which assures that the electric field of electromagnetic radiation such as radar incident thereon is zero at the surface and that there is total reflection of the electromagnetic energy. Spaced apart from the conducting ground plane is an electrically thin resistive layer having an impedance of about 377 ohms per square. This is a material commonly known as "space cloth" since the impedance is substantially that of free space and conductive fabric is often so employed. With such an impedance no reflection occurs from the resistive sheet of space cloth. To form a quarter wave absorber the resistive layer is spaced from the ground plane at exactly one-quarter wave length of the radiation it is desired to absorb. A quarter wave absorber is described and illustrated by W. W. Salisbury in U.S. Patent 2,599,944. The mathematical and physical nature of quarter wave absorbers is discussed in detail by S. Ramo and J. Whinnery in Fields and Waves in Modern Radio (1962) and by R. I. Sarbacher and W. A. Edson in Hyper and Ultra-high Frequency Engineering (1950).

Radar or other electromagnetic energy incident on such a quarter wave absorber passes through the resistive sheet of space cloth and is reflected by the conductive ground plane thereby setting up a standing wave. At the ground plane where reflection occurs the electric field is zero and at one-quarter wave length away from the ground plane the electric field permits some current flow and dissipates the radar energy in the form of heat. It is found that radar of a particular frequency when incident on a properly fabricated quarter wave absorber has no reflection therefrom. In a similar manner a resistive layer placed at three-quarters wavelength from the ground plane is also effective as a quarter wave absorber since the electric field of a reflected wave is again at a maximum. The same is true of higher odd integral numbers of quarter wavelengths.

The distance between the resistive sheet and the conductive ground plane in a quarter wave absorber is one-quarter wave length of the radiation it is desired to absorb. The wave length of concern is the wave length within the material between the resistive sheet and the conductive ground plane. In most quarter wave absorbers this dielectric material is air which has substantially the same electrical properties as free space and the resistive sheet is spaced from the ground plane one-quarter of the wave length of the radar radiation in free space. Materials having a higher dielectric constant or magnetic permeability than air have been interposed between the resistive layer and the conductive ground plane in order to reduce the wave length of the radiation and minimize the total thickness of quarter wave absorber. Such absorbers have been limited to a single frequency.

The properties and characteristics of a quarter wave absorber are manifest from a consideration of the impedance transfer equation $$Z_i = \eta \left( \frac{Z_1 \cosh \gamma l + \eta \sinh \gamma l}{\eta \cosh \gamma l + Z_1 \sinh \gamma l} \right)$$

where $Z$ is the ratio of the total complex electric field at a point to the total complex magnetic field at the point, $\eta$ is the intrinsic impedance, $\gamma$ is the propagation constant and $l$ is the thickness of the material within a quarter wave absorber. A diagram of a quarter wave absorber is shown in FIG. 1. As illustrated in this figure there is provided a good conductor 10 such as a sheet of metal. Spaced apart from the good conductor a distance $l$ is a front layer comprising an electrically thin impedance layer 11 such as, for example, space cloth having a thickness $d$ and a conductivity $\sigma$ such that $1/\sigma d = 377$ ohms. The quarter wave absorber has an electromagnetic wave of frequency $f$ impinging on the front surface thereof.

Considering the medium between the good conductor 10 and the impedance layer 11 as uniform in electrical properties medium has a propagation constant $$\gamma = 2\pi f i \sqrt{\tilde{\mu}\tilde{\epsilon}}$$

where $\tilde{\mu}$ is the complex magnetic permeability and $\tilde{\epsilon}$ is the complex electrical permittivity; and an intrinsic impedance $$\eta = \sqrt{\tilde{\mu}\tilde{\epsilon}}$$

If plane waves are traveling through this medium, the electric field is given by $$E_x(z) = e^{\gamma z} + A e^{-\gamma z}$$

where $A$ is a constant. From Maxwell's equations it is known that $$\frac{\partial E_x}{\partial z} = -\tilde{\mu} \frac{\partial H_y}{\partial t}$$

where $E$ and $H$ are the electric and magnetic fields respectively and $t$ is time. For a sinusoidal variation in time as found in radar waves $$\frac{\partial E_x}{\partial z} = -2\pi f i \tilde{\mu} H_y$$

Thus the impedance is $$Z_z = \frac{E_x}{H_y} = -\eta \left( \frac{e^{\gamma z} + A e^{-\gamma z}}{e^{\gamma z} - A e^{-\gamma z}} \right)$$

The constant $A$ is determined by equating this expression to $Z_1$ at $z=0$. The resulting expression is then evaluated at $z=-l$ to give the input impedance, $Z_i$, in terms of $\eta$, $Z_1$ and $\gamma l$ which is exactly the impedance transfer equation set forth above $$Z_i = \eta \frac{Z_1 \cosh \gamma l + \eta \sinh \gamma l}{\eta \cosh \gamma l + Z_1 \sinh \gamma l}$$

The impedance transfer equation is employed to demonstrate the origin of the characteristics of a quarter wave absorber, namely a thickness of one-quarter wave length between a good conductor and a layer with an impedance of 377 ohms. Because the impedance at the short circuit of the good conductor 10 is zero ($E=0$ in an ideal conductor) the impedance transfer equation gives the impedance at a distance from the good conductor as $$Z_2 = \eta_2 \tanh \gamma_2 l$$

When $\gamma l$ is taken as equal to $i\pi/2$, where $l=\lambda_2/4$, the wave impedance at the back of the front impedance layer is infinite. Using the impedance transfer equation again as $Z_1$ goes to infinity, it is shown that the wave impedance at the front surface of the quarter wave absorber is given by $$Z_3 = \eta_3 \coth \gamma_3 d$$

It is preferred that the front impedance layer be electrically thin, namely that $\gamma_3 d$ be less than about 0.3, and with that condition $$Z_3 = \frac{\eta_3}{\gamma_3 d} = \frac{\sqrt{\tilde{\mu}/\tilde{\epsilon}}}{\lambda \omega d \sqrt{\tilde{\mu}\tilde{\epsilon}}} = (i\omega \tilde{\epsilon} d)^{-1}$$

where $\omega$ is the angular frequency, and for a thin conducting film this becomes $$Z_3 = 1/\sigma d$$

The reflection coefficient due to an impedance mismatch between the quarter wave absorber and free space is given by $$\left| \frac{Z_3 - \eta_0}{Z_3 + \eta_0} \right|^2$$

where $\eta_0$ is the intrinsic impedance of free space, which is equal to 377 ohms. To reduce the reflectivity to zero requires that $Z_3 = 1/\sigma d = 377$ ohms as stated above.

In present absorbers, low reflection is obtained only over a limited frequency range. Some broad band absorption is obtained by adding a number of layers with consequent weight and volume penalties. When only one layer is to be used for a band of frequencies, the electrical properties of the layer must be changed for each frequency so that the quarter wave length condition holds and reflection is minimized.

In a preferred embodiment of the present invention the active quarter wave absorber depends on the fact that the electric permittivity of certain materials is changed with an impressed electric field. The signal to be absorbed is detected and its frequency measured. The proper electric field is then impressed on the absorber to establish the quarter wave length condition for that frequency. An active absorber requires a source of energy in addition to the energy of the electromagnetic wave. This additional energy is used to alter the electrical properties of the quarter wave absorber and enhance its ability to absorb the incident electromagnetic energy. The active system employs external energy to create an electric field in the core of the quarter wave absorber that is superimposed on the electric field due to the incident wave. This varies the electric permittivity of the medium between the good conductor and the impedance layer so that the distance $l$ will be equal to one quarter wave length regardless of the frequency of the incident electromagnetic wave.

The wave length of an electromagnetic energy wave in a material is given by the relation $$\lambda_m = \frac{1}{f}\left\{\frac{\epsilon'\mu' + \epsilon''\mu''}{2}\left[1 + \sqrt{1 + \left(\frac{\epsilon'\mu' + \epsilon''\mu''}{\epsilon'\mu' - \epsilon''\mu''}\right)^2}\right]\right\}^{-1/2}$$

For a quarter wave absorber employing a static electric field for frequency tuning, the material between the good conductor and the impedance layer usually has a very low magnetic permeability. In the condition when $\tilde{\mu} = \mu_0$, the wave length in the material is $$\lambda_m = 1/f\{\tfrac{1}{2}\epsilon'\mu'[1 + \sqrt{1 + \tan^2 \delta}]\}^{-1/2}$$

where tan $\delta$ is the loss tangent of the material or tan $\delta = \epsilon''/\epsilon'$.

Further if the loss tangent is less than about 0.5, the wave length approximates that in a completely lossless material $$\lambda_m \cong \frac{1}{f\sqrt{\epsilon'\mu'}}$$

and the thickness required for a quarter wave absorber is $$l = \frac{n\lambda_m}{4} = \frac{n}{4f\sqrt{\epsilon'\mu'}} = \frac{nc}{4f\sqrt{\mu_r \epsilon_r}}$$

where $n$ is any odd integer, $c$ is the velocity of light, $\mu_r$ is the relative magnetic permeability to the permeability of free space and $\epsilon_r$ is the relative electric permittivity to the permittivity of free space.

In order to change the quarter wave absorber from one tuned to an electrical thickness at the first absorption peak, namely $\lambda/4$, to one tuned to the second absorption peak, namely $3\lambda/4$, with a fixed thickness $l$, the value of $\epsilon'\mu'$ must decrease by a factor of 9. Similarly a relative change of 2.8 in $\epsilon'\mu'$ is required between $3\lambda/4$ and $5\lambda/4$ and a relative change of 2.0 in $\epsilon'\mu'$ is required between $5\lambda/4$ and $7\lambda/4$.

Since in a preferred embodiment the material is non-magnetic $\mu_r = 1$ and the thickness $l$ is fixed for a given absorber the relation can be expressed as $$\epsilon_r f^2 = \text{constant}$$

Thus if the permittivity of the material between the good conductor and the impedance layer varies with frequency as the inverse square, the quarter wave absorber will be tuned for all frequencies.

If, for example, the frequency range to be covered extends from 1 to 3 gHz. (gigaHertz or $10^9$ cycles per second), the permittivity must vary by a factor of nine when using the first and second absorption peaks. Since the permittivity must vary as the inverse square of the frequency, it is necessary to employ materials for which the permittivity varies over a rather wide range. Ferroelectric materials, such as for example, barium titanate and modifications thereof, have extremely high permittivities and in the high frequency region, the permittivity decreases with an increase in frequency. The rate of decrease is, however, less than the required $1/f^2$ rate.

The permittivity of barium titanate and the like is sensitive to the application of an external electric field so that the permittivity at a given frequency can be depressed by application of an electric field. Since the ferroelectric materials do not naturally respond according to the inverse square law, the change in permittivity is augmented by the application of an external field. This field is readily obtained by impressing a potential between the good conductor and the thin impedance layer of a quarter wave absorber.

Figure 2:
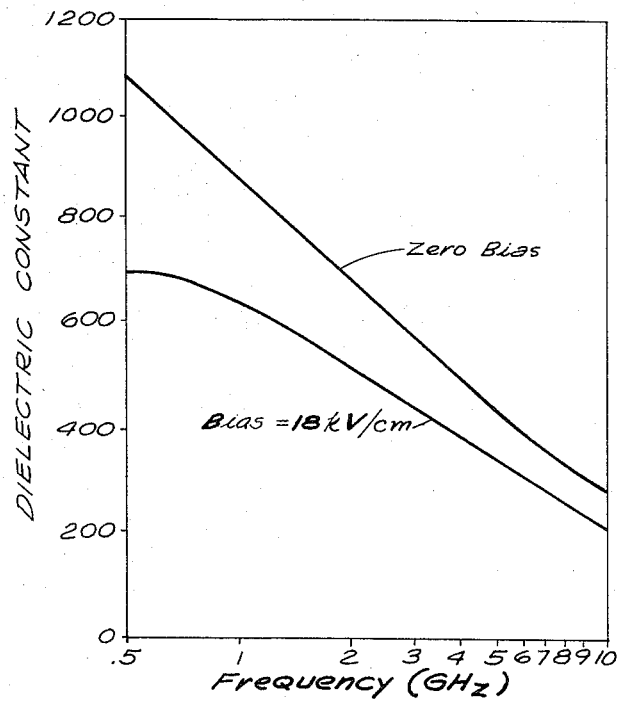
FIG. 2 illustrates the frequency dependence of electric permittivity of barium titanate as a function of static electric field.

FIG. 2 illustrates the relative dielectric constant $\epsilon_r$ as a function of frequency for barium titanate at 25° C. The upper curve represents the dielectric constant as a function of frequency when no electric field is impressed across the barium titanate. The lower curve represents the dielectric constant as a function of frequency when a static electric field of 18,000 volts per centimeter is impressed across the barium titanate. If, for example, it is desired to employ a quarter wave absorber in the frequency band from 1 to 3 gHz., it is noted that the dielectric constant with no bias on the barium titanate at 1 gHz. is about 890 and the dielectric constant with an 18,000 v./cm. bias at 3 gHz. is about 440. This is insufficient change for a quarter wave absorber with a thickness tunable between the first and second absorption peaks, namely $\lambda/4$ and $3\lambda/4$ respectively but is sufficient for one tunable between the third and fourth absorption peaks, namely $5\lambda/4$ and $7\lambda/4$ respectively.

The dielectric material employed between the good conductor and the impedance layer in a quarter wave absorber that is tunable over a range of frequencies is preferably a ferroelectric material because of the high dielectric constants available and the variation in dielectric constant in response to a voltage bias. The analysis of the characteristics of the quarter wave absorber set forth above was somewhat simplified by considering the loss tangent to be less than 0.5. In many ferroelectric materials, the loss tangent is higher than the expression for wave length in a lossless material must be modified for a lossy material. The equation for the tuned or resonance condition is then $$l = \frac{n\lambda}{4} = \frac{nc}{4f}\sqrt{\frac{2}{\epsilon_r' + |\tilde{\epsilon}_r|}}$$

where $$|\tilde{\epsilon}_r| = \sqrt{\epsilon_r'^2 + \epsilon_r''^2}$$

In the manner as above for a lossless absorber, the relation can be stated as $$f^2(\epsilon_r' + |\tilde{\epsilon}_r|) = \text{constant}$$

for the resonant or tuned condition and to obtain absorption over a range of frequencies, $\epsilon_r' + |\tilde{\epsilon}_r|$ must vary as the inverse square of the frequency.

Also, it is necessary for lossy materials to use a complex propagation constant in determining the input wave impedance at the rear of the impedance layer. For this reason it is preferred to employ an impedance layer having a large dielectric constant rather than a purely resistive layer. The provision of a complex conductivity in the impedance layer assists in matching the impedance of the lossy ferroelectric to that of free space, thereby minimizing the reflectivity of the quarter wave absorber.

Figure 3:
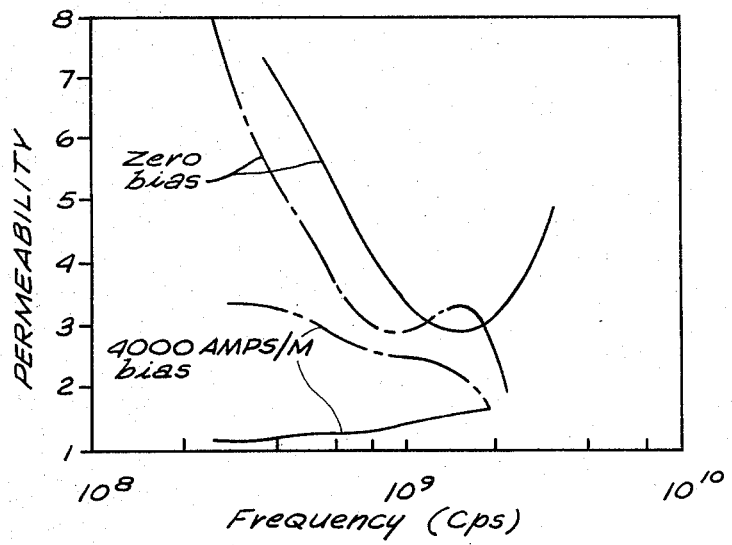
FIG. 3 illustrates the effect of frequency and magnetic field on the magnetic permeability of nickel ferrite.

It will be apparent to one skilled in the art that an exactly analogous analysis is employed for changes in magnetic permeability to obtain tuning of a quarter wave absorber. FIG. 3 illustrates the variation in relative magnetic permeability of nickel ferrite, $NiFe_2O_4$ as a function of frequency. Curves for both the real, $\mu_r'$ (dashed), and imaginary, $\mu_r''$ (solid), portions of the relative magnetic permeability are shown. The upper two curves illustrate the variation of permeability with no magnetic field on the nickel ferrite and the lower two curves illustrate the variation of permeability with an applied magnetic field of 4,000 amperes per meter. Values of permeability intermediate between these curves can, of course, be obtained with less intense magnetic fields.

Another readily variable intensive quantity that is useful for adjusting the absorption peak of a quarter wave absorber is temperature. The analytical basis for variation in absorption frequency peak is the same as for electric or magnetic field variations, only the means for varying the electrical properties of the medium is different. There are a variety of materials that exhibit variations in electric permittivity or magnetic permeability in response to variations in temperature and any of these having sufficiently low loss tangent and sufficiently high variation for the bandwidth desired can be employed. Several nickel-zinc ferrite compositions exhibit substantial changes in magnetic permeability as a function of temperature. Data on the variation of the real and imaginary components of magnetic permeability of several such materials as a function of temperature and frequency are given by P. Miles, W. Westphal and A. von Hippel in Review of Modern Physics, volume 29 (1957), at page 297.

Figure 4:
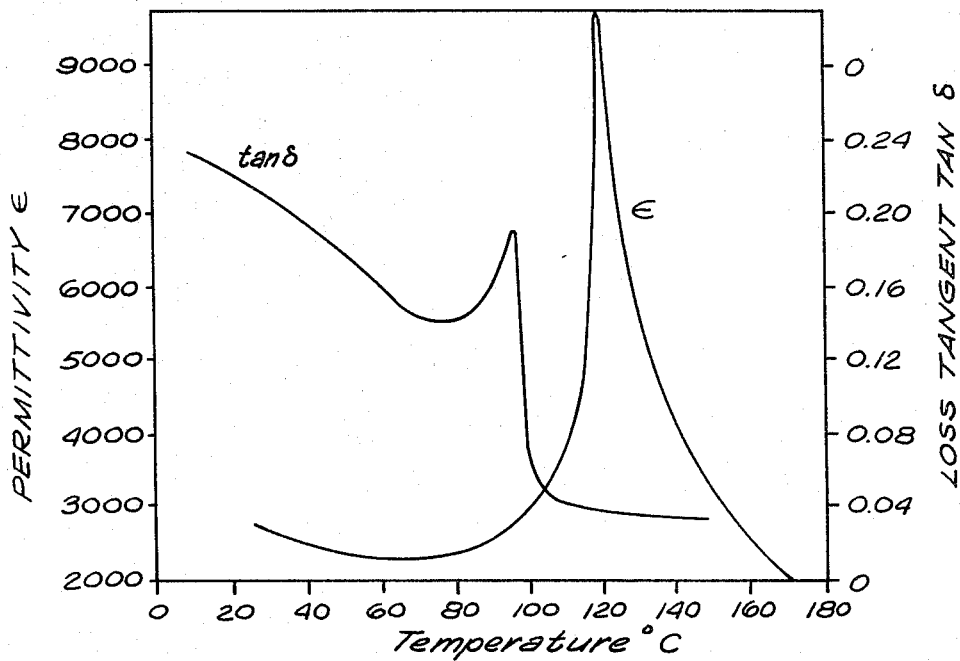
FIG. 4 illustrates the effect of temperature on electric permittivity of barium titanate compositions.

FIG. 4 illustrates the effect of temperature on the relative electric permitivity $\epsilon_r'$, and the loss tangent, tan $\delta$, of barium titanate at about one megacycle per pound. It is apparent that in the temperature region between 100 and 120° C., the Curie temperature of barium titanate, there is a large change in the relative electric permittivity or dielectric constant, and also that the loss tangent in this region is low so that the barium titanate can be considered lossless for analytical purposes. Barium titanate without modification gives a bandwidth for a quarter wave absorber 0.050 inch thick of greater than 2 gHz. with a temperature variation of less than 20° C. and a bandwidth of about 6 gHz. with the same temperature change in an absorber 0.015 inch thick. Greater bandwidth is available with barium titanate to which $Fe_2O_3$, for example, has been added.

In accordance with the principles of the present invention in order to obtain attenuation of radar over a broad frequency range the effective electrical thickness of the quarter wave absorber is controllably varied by controlling an intensive quantity to provide complete absorption at a desired frequency. To attenuate radar at a lower frequency the electric permittivity, for example, is decreased so that the effective electrical thickness of the quarter wave absorber is increased and to attenuate radar of a higher frequency the effective electrical thickness is decreased by increasing the electric permittivity. However, when the frequency is sufficiently high instead of further increasing the permittivity, the absorber can be tuned to the first odd harmonic corresponding to $3\lambda/4$. Similarly at still higher frequencies the absorber can be tuned to either the second odd harmonic thickness ($5\lambda/4$) or higher odd harmonic thicknesses ($7\lambda/4$ or $9\lambda/4$ etc.).

Figure 5:
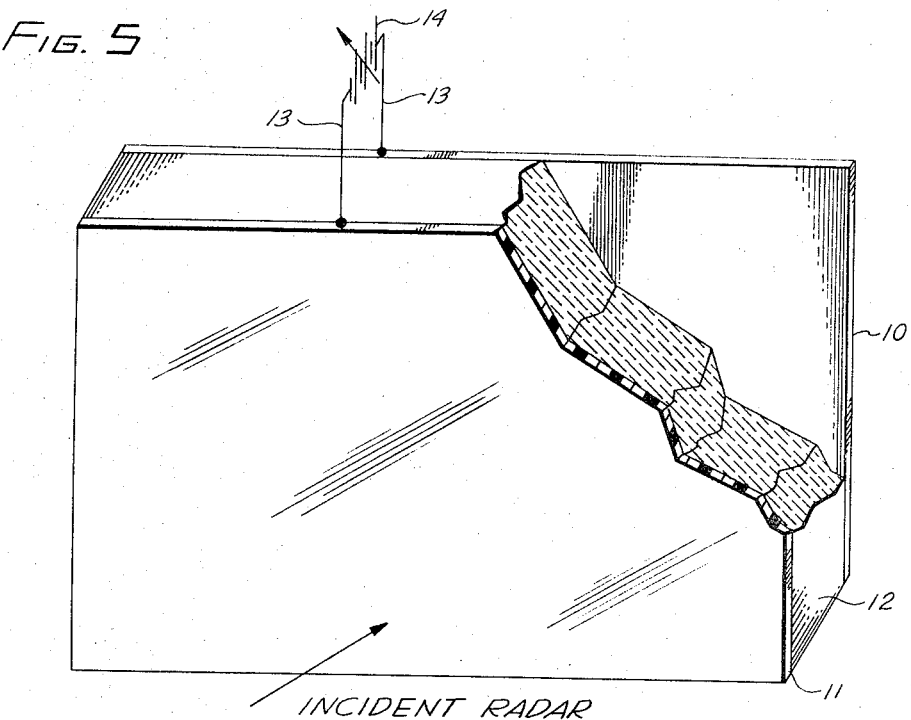
FIG. 5 illustrates a panel of radar attenuator material formed according to the principles of this invention.

FIG. 5 illustrates a portion of a panel of radar absorbing material constructed according to the principles of this invention. The panel of radar absorbing material illustrated in FIG. 5 can serve, for example, as a shield for a potential target or is readily incorporated into a potential target as a structural element thereof to provide radar camouflage. Because of the relative thinness of a quarter wave absorber constructed according to the principles of this invention, it can also be applied as a "coating" on the surface of a potential target and will cover an area having an extent considerably greater than the wavelength of the radar anticipated. Tunable or active radar absorbing materials provided in the practice of this invention are also useful for tuned transmission lines, tuned strip lines, screen rooms and field test vans in addition to military target camouflage.

As illustrated in the preferred embodiment of FIG. 5 there is provided an electrically conductive ground plane 10 which preferably comprises a sheet of metal. It will be understood that although the term "ground plane" is used that this sheet of metal is not necessarily a geometric plane but may have any necessary curvature. Spaced apart from the ground plane 10 and substantially parallel thereto is an impedance layer 11 that provides an impedance match between the 377 ohm characteristic impedance of tree space and the impedance of the quarter wave absorber. The ground plane and impedance layer can extend over any selected target and are not limited in extent by the wavelength of radiation to be attenuated.

The impedance layer in a preferred embodiment where the medium between the conductive ground plane and the impedance layer is substantially lossless comprises a sheet of fabric impregnated or coated with an elastomer having carbon particles dispersed therein. The size, type, and proportion of carbon particles distributed in the elastomer determines the electrical impedance of the impedance layer and a resistance of 377 ohms per square is readily obtained. Such a material, sometimes known as space cloth, is commercially available. In instances where the loss tangent of the medium is appreciable it is desirable to employ an impedance layer having a reactive component so that the reactive component of the lossy medium is also matched to the impedance of free space. For this purpose, high refractive index resins can be employed in place of the elastomer in the impedance layer or preferably a thin high refractive index can be employed over the imepdance layer. This latter has the added advantage of refracting off-normal radar waves toward the normal to the surface, thereby giving good absorption over wide angles of incidence of radar on a surface. A suitable layer of high refractive index comprises a dispersion of metal particles in an elastomer such as is described in U.S. Patent 2,875,435.

Interposed between the resistive layer 11 and the ground plane 10 is a ferroelectric material 12, such as, for example, barium titanate, barium-strontium titanate, barium titanate with ferric oxide added or other ferroelectric material. Electrical leads 13 are connected to the ground plane 10 and to the resistive layer 11. Because of the relatively high impedance of the impedance layer 11, it is desirable to employ a plurality (not shown) of electrical leads thereto when a substantial area of quarter wave absorber is involved. A number of suitable arrangements of electrical leads to provide a substantially uniform electric field between the ground plane and the resistive layer will be apparent to one skilled in the art. Connected to the electrical leads 13 is a power supply 14 which provides a relatively high D.C. voltage so that a substantial electric field is imposed across the ferroelectric material between the good conductor 10 and the impedance layer 11. The power supply 14 is adjustable so that the magnitude of the electric field can be varied in order to modify the electric permittivity of the ferroelectric material as desired.

The frequency of radar incident on a structure having a tunable quarter wave absorber is readily determined by conventional electronic apparatus (not illustrated in this figure) or may be determined by intelligence operations. The electric field across the ferroelectric material incorporated in the quarter wave absorber is then manually adjusted to have an optimum value corresponding to maximum absorption and minimum reflection of radar of the detected frequency. The manual adjustment is readily made by reference to tables or charts giving material parameters as a function of frequency or similar tables or charts giving the exact electric fields bias voltage that is optimum for a given radar frequency. The magnitude of radar energy reflected from the tunable quarter wave absorber can also be detected by a suitable antenna system and the electric field across the quarter wave absorber manually adjusted for minimum reflection.

In many tactical military situations it may be desirable to adjust the effective electrical thickness of the radar absorbing material to the optimum for a threat radar at a more rapid rate than can be provided manually. When this is desired automatic means are readily provided for adjusting thickness in response to frequency variations. A typical automatic system that can be employed is illustrated in block form in FIG. 6. As will be apparent to one skilled in the art, other automatic systems are also readily employed for computing the desired electric characteristics and controlling the effective electrical thickness of the quarter wave absorber.

Figure 6:
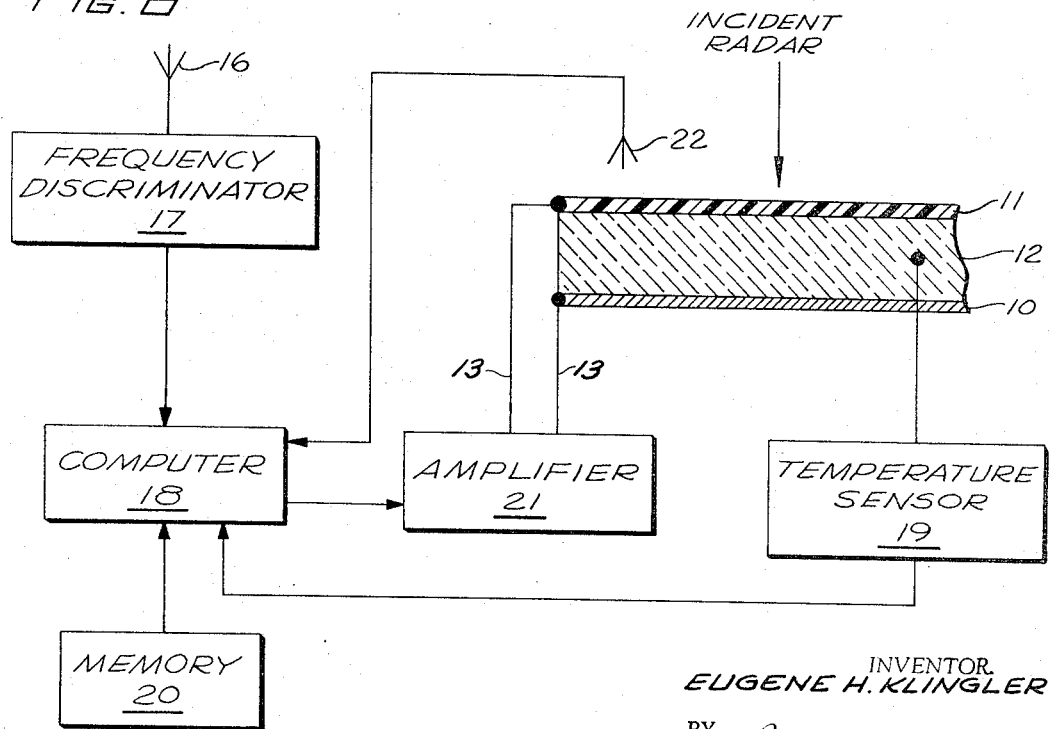
FIG. 6 illustrates in block form an attenuator system incorporating a panel of tunable quarter wave absorber.

As illustrated in FIG. 6 there is provided an antenna 16 for detecting radar that is incident on the tunable quarter wave absorber 10–12. This radar signal from the antenna 16 is applied to a frequency discriminator 17 that provides a signal having a voltage corresponding to the frequency of the received signal. The signal from the frequency discriminator is in turn applied to a computer 18 that generates a signal corresponding to the desired electric field across the quarter wave absorber. The computer determines the desired voltage bias from stored information giving an optimum field for a given frequency, or preferably from stored information giving the electrical properties of the ferroelectric material in the quarter wave absorber in terms of electric field, frequency and temperature.

One form of simple computer useful in the practice of this invention is illustrated in FIG. 7. The computer comprises a non-linear potentiometer 23 or the like driven by a motor 24 controlled by the discriminator 17 to provide an output voltage that varies with input according to a predetermined relation. This relation defines the non-linearity of the potentiometer and is determined by mathematical analysis or empirical observations of the voltage change across the absorber with incident frequency change as required for optimum absorption.

Referring again to FIG. 6, for more sophisticated and precise control a temperature sensor 19 is provided in the ferroelectric material 12 connected to a more sophisticated computer 18 to provide information concerning the temperature of the radar attenuator. A memory bank 20 is provided in conjunction with the computer 18 for the storage of various material constants that are required in the computation of the desired electric field. The electric permittivity and magnetic permeability of the ferroelectric material 12 as a function of temperature, frequency, and electric field are stored as well as the physical dimensions of the quarter wave absorber. With this information and the measured intensive quantities of temperature and frequency, the computer readily solves for the desired electric field to be applied across the quarter wave absorber by means of the relations set forth above.

The signal from the computer 18 is suitably amplified by an amplifier 21 which is analogous to the variable power supply 14 as illustrated in FIG. 5, and the amplified signal is applied as an electric field across the quarter wave absorber by means of the electrical leads 13.

If it is desired to compensate for any inaccuracies or approximations in the computation of the electric field, a feedback arrangement is provided. For this purpose an antenna 22 is directed so as to receive any radar signal reflected from the radar absorbing material 10–12. The amplitude of the reflected signal detected is applied as a feedback signal to the computer 18 for the purpose of minimizing the reflected signal. In addition to minimizing the effect of computational approximations the feedback arrangement also adjusts the electric field across the quarter wave absorber to obtain optimum tuning for incident radar that is not exactly normal to the quarter wave absorber surface. By this means the total radar echo from the surface is minimized.

FIG. 8 illustrates a portion of a panel of radar attenuating material that is tuned by means of a magnetic field on the absorber. As illustrated in this embodiment there is provided an electrically conductive ground plane 30 which is preferably a sheet of metal. Spaced apart from the conductive ground plane 30 and substantially parallel thereto is an impedance layer 31 that provides an impedance match between the 377 ohm characteristic impedance of free space and the impedance of the quarter wave absorber. Between the conductive ground plane 30 and the impedance layer 31 there is provided a ceramic material 32 having a relatively high magnetic permeability as compared with air. Suitable materials for the ceramic layer 32 comprise nickel ferrite, nickel-zinc ferrites and magnesium-manganese ferrites. Electrical leads 33 are connected to separated portions of the conductive ground plane 30 so that a substantial electric current can be applied thereto. A variable power supply 34 is connected to the leads 33 for providing a current to the conductive ground plane. The variable power supply 34 is conveniently manually adjusted to provide a current for minimizing the radar echo from the radar attenuating material. It will also be apparent that automatic adjustment of the variable power supply 34 can be provided in a manner exactly analogous to that previously described. The current flowing through the conductive ground plane induces a magnetic field in the relatively thin ceramic layer 32 thereby varying the magnetic permeability of the ceramic, hence the effective electrical thickness of the quarter wave absorber in the manner described above to minimize reflection of radar. This embodiment requires more external energy than the preferred embodiment but is advantageous in situations where substantial voltages are undesirable or where electrical leads to the impedance layer are undesirable.

FIG. 9 illustrates a portion of a panel of radar attenuating material constructed according to the principles of this invention. As illustrated in this embodiment there is provided a conductive ground plane 40 which is preferably a sheet of metal. Spaced apart from the conductive ground plane and substantially parallel thereto is provided an impedance layer 41 that provides an impedance match to the 377 ohm intrinsic impedance of free space. Interposed between the conductive ground plane 40 and the impedance layer 41 is a ferroelectric material 42 that has a product of electric permittivity and magnetic permeability substantially higher than the corresponding properties of air. The ceramic material 42 is preferably a low loss barium titanate such as that having iron oxide added or a barium-lead zirconate. On the surface of the metal layer 40 there is applied an electrically insulating layer 43 such as Formvar varnish, shellac, rubber, or the like. On the electrically insulating layer 43 there is provided an electrical resistance element 44 which is preferably substantially uniformly distributed over the entire surface. An electric current passed through the resistive element 44 causes heating thereof for regulating the temperature of the quarter wave absorber. A temperature sensor 47 such as a thermocouple or thermistor is provided in the ceramic material for monitoring the temperature thereof.

In structures of the type described and illustrated herein the total thickness of the quarter wave absorber is quite small and thermal equilibrium is rapidly obtained. If desired, thermal insulation can be provided to minimize heat losses. Electrical leads 45 are connected to the resistive element 44 for providing an electrical current thereto and a variable power supply 46 is connected to the electrical leads 45. The variable power supply 46 is conveniently manually adjusted to provide a temperature in the quarter wave absorber that gives minimum reflection of radar from the attenuator. The variation in temperature of ferroelectric material 42 serves to modify the electric permittivity and magnetic permeability thereof so that the effective electrical thickness of the quarter wave absorber is readily adjusted. It will be apparent to one skilled in the art that in certain situations in order to obtain rapid response time, automatic control of the variable power supply 46 can be provided. It will also be apparent that other temperature regulating systems can be employed for varying the effective electrical thickness of the quarter wave absorber, including other heat sources or refrigeration depending on the Curie temperature of the ferroelectric material selected for a particular embodiment.

Obviously many modifications and variations of the present invention are possible in light of the above teachings. It is therefore to be understood that within the scope of the appended claims the invention may be practiced otherwise than as specifically described.

What is claimed is:
1. An active radar camouflage system comprising:
an absorber of radar frequency electromagnetic energy having a surface extent much larger than the wavelength of incident energy; and means for tuning said absorber for optimum absorption as a function of frequency of radar incident on said absorber.

2. An active attenuator of electromagnetic energy comprising:
an electrically conductive ground plane;
an impedance layer spaced apart from said ground plane;
a dielectric material between said ground plane and said impedance layer and having intensive parameters of permittivity and permeability; and
means for controllably varying one of the parameters of said dielectric material to tune the attenuator to frequency of electromagnetic energy incident on the attenuator.

3. An active attenuator of electromagnetic energy as defined in claim 2 wherein said means for varying one of the parameters of said dielectric material comprises:
means for controllably varying temperature of said dielectric material.

4. An active attenuator of electromagnetic energy as defined in claim 2 wherein said means for varying one of the parameters of said dielectric material comprises:
means for varying the magnetic permeability of said dielectric material.

5. An active attenuator of electromagnetic energy as defined in claim 4 wherein said means for varying the magnetic permeability comprises:
means for applying a magnetic field to said dielectric material.

6. An active attenuator of electromagnetic energy as defined in claim 2 wherein said means for varying one of the parameters of said dielectric material comprises:
means for varying the electric permittivity of said dielectric material.

7. An active attenuator of electromagnetic energy as defined in claim 6 wherein said means for varying the electric permittivity comprises:
means for applying an electric field to said dielectric material.

8. An active attenuator of electromagnetic energy as defined in claim 7 wherein said means for applying an electric field to said dielectric material further comprises:
a first electrical contact on said conductive ground plane;
a second electrical contact on said impedance layer; and
a variable power supply means for generating a voltage between said first electrical contact and said second electrical contact.

9. An active attenuator of electromagnetic energy as defined in claim 8 wherein said means for applying an electric field to said dielectric further comprises:
means for detecting frequency of electromagnetic energy incident on the attenuator;
means for controlling variation of said power supply means in response to the frequency detected; and
feedback means responsive to electromagnetic energy reflected from the attenuator for providing a signal to said means for controlling variation.

10. A radar camouflage structure comprising:
an electrically conductive ground plane;
an impedance layer spaced apart from said ground plane at a distance considerably less than the extent of said plane and layer; and means for controllably varying the effective electrical distance between said layer and said ground plane for tuning the camouflage structure toward a maximum of attenuation at the frequency of incident radar energy.

11. An active radar camouflage system comprising:
a quarter wave absorber of electromagnetic energy;
means for tuning said absorber for optimum absorption as a function of frequency of radar incident on said absorber;
antenna means for detecting radar reflection from said absorber;
feedback means connecting said means for tuning and said antenna means for minimizing reflecting from said absorber.

12. A method of attenuating electromagnetic energy of arbitrary frequency comprising:
detecting the frequency of electromagnetic radiation;
varying the properties of dielectric material between the good conductor and the impedance layer of a quarter wave absorber in response to said detected frequency to obtain an effective electrical distance therebetween equal to $n/4$ times the wave length of the radiation where n is an odd integer;
detecting the amplitude of electromagnetic radiation reflected from the quarter wave absorber; and
employing the detected amplitude as feedback for minimizing the amplitude of reflected energy.

13. An active attenuator of electromagnetic energy comprising:
an electrically conductive ground plane;
an impedance layer spaced apart from said ground plane and substantially parallel thereto, said impedance layer having an extent much larger than the wave length of energy to be attenuated;
a dielectric material between said ground plane and said impedance layer;
antenna means for receiving electromagnetic energy;
discriminator means connected to said first antenna means for providing a signal representative of frequency of the electromagnetic energy;
means responsive to the signal from said discriminator means for providing an output voltage that varies with said signal according to a predetermined relation; and
means for employing the output voltage for changing intensive properties of said dielectric material.

14. An active attenuator of electromagnetic energy as defined in claim 13 wherein said means for changing intensive properties comprises:
means for varying the electric field on said dielectric material for varying the permittivity thereof.

15. An active attenuator of electromagnetic energy as defined in claim 13 wherein said means for changing intensive properties comprises:
means for varying the magnetic field on said dielectric material for varying the permeability thereof.

16. An active attenuator of electromagnetic energy as defined in claim 13 wherein said means for changing intensive properties comprises:
means for varying the temperature of said dielectric material for varying the permittivity and permeability thereof.

17. An active attenuator of electromagnetic energy as defined in claim 13 further comprising:
a second antenna means for receiving electromagnetic energy reflected from the attenuator; and
feedback means for varying the output voltage in response to amplitude of electromagnetic energy reflected from the attenuator.

No references cited.

CHESTER L. JUSTUS, *Primary Examiner.*

C. E. WANDS, *Assistant Examiner.*